United States Patent
Collins et al.

(10) Patent No.: US 6,723,245 B1
(45) Date of Patent: Apr. 20, 2004

(54) METHOD OF USING WATER SOLUBLE CATIONIC POLYMERS IN MEMBRANE BIOLOGICAL REACTORS

(75) Inventors: John H. Collins, Bloomingdale, IL (US); Kristine S. Salmen, Glen Ellyn, IL (US)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 10/035,785

(22) Filed: Jan. 4, 2002

(51) Int. Cl.$^7$ .............................. C02F 3/12; C02R 3/06
(52) U.S. Cl. ...................... 210/614; 210/615; 210/623; 210/631; 210/639; 210/651; 210/729; 210/734; 210/735
(58) Field of Search ................................ 210/614, 622, 210/623, 626, 631, 732–735, 205, 321.69, 605, 607, 615, 617, 636, 639, 650, 651, 723, 725–730, 806

(56) References Cited

U.S. PATENT DOCUMENTS

| | | | | |
|---|---|---|---|---|
| 3,472,765 A | * | 10/1969 | Budd et al. ................. | 210/607 |
| 4,749,494 A | * | 6/1988 | Tomoyasu et al. .......... | 210/626 |
| 5,254,253 A | * | 10/1993 | Behmann ..................... | 210/607 |
| 5,266,203 A | | 11/1993 | Mukhopadhyay et al. .. | 210/638 |
| 5,494,577 A | * | 2/1996 | Rekers ................... | 210/321.69 |
| 5,558,774 A | * | 9/1996 | Tonelli et al. .............. | 210/612 |
| 5,914,040 A | * | 6/1999 | Pescher et al. ............. | 210/639 |
| 5,932,099 A | * | 8/1999 | Cote et al. .................. | 210/605 |
| 6,416,668 B1 | | 7/2002 | Al-Samadi .................. | 210/636 |
| 6,428,705 B1 | * | 8/2002 | Allen et al. ................. | 210/638 |
| 6,517,723 B1 | * | 2/2003 | Daigger et al. ............. | 210/605 |

FOREIGN PATENT DOCUMENTS

| | | |
|---|---|---|
| EP | 888810 | 1/1999 |
| JP | 63091196 | 4/1988 |
| JP | 3004996 | 1/1991 |
| JP | 4004098 | 1/1992 |
| JP | 5345195 | 12/1993 |
| JP | 7232192 | 9/1995 |

OTHER PUBLICATIONS

Bergman, R.A., Joffe, D., Adams, N., Porter, R., "Gwinnett County Water Reclamation with 50 mgd Ultrafiltration—Proof Testing and Design", American Water Works Association, Membrane Technology Conference, pp. 1–13, 2003.

"Design Considerations for Small Drinking Water Membrane Systems", Pall Corporation, www.pall.com/water_8155.asp, pp. 1–5, undated.

"Indirect Potable Water Reuse, San Diego Water Purification Project", www.cmhc–schl.gc.ca/en/imquaf/himu/wacon/wacon_016.cfm, pp. 1–3, undated.

Laïné, J.M., Campos, C., Baudin, I., Janex, M.L., Understanding Membrane Fouling: A Review of Over a Decade of Research, Ondeo Services— CIRSEE.Email: jean–michel.laine@ondeo.com, pp. 351–361, undated.

"Chemical Pretreatment For RO and NF", Technical Application Bulletin No. 111, Revision A, Hydranautics A Nitto Denko Corporation, www.membranes.com, pp. 1–15, Mar. 22, 2002.

"HydraCoRe Chlorine Tolerant Spiral Wound Nanofiltration Color Removal Membrane Elements", Technical Application Bulletin No. 109, Revision B, Hydranautics A Nitto Denko Corporation, www.membranes.com, pp. 1–10, Feb. 22, 2002.

"Death Taxes . . . and RO Membrane Fouling", GE Water Technologies, Water Technology 69, www.gewater.com/library/tp/701_Death_Taxes.jsp, pp. 1–6, Nov. 1995.

Gould, C.K., Harrold, S.J., Weitnauer, A.K., "A Practical Approach to Controlling the Fouling of Ultrafiltration Membranes: A Case Study of the Successful Development of a Commercial Soy Protein Application", www.environmental–center.com/articles/article384/article384.htm, pp. 1–14, Apr. 1992.

"Chemical Compatibility Desal Membrane Products— Membrane Types and Product Designations", Undated.

Layson, A., "Microfiltration—Current Know–how and Future Directions", IMSTEC, Sydney, Australia, 2003, Date Considered Dec. 16, 2003.

Roquebert, V., Cleveland, C., Leaf, D., "Identifying and Resolving Key Design Considerations for Integration of Low Pressure Membrane Filtration and Lime Softening Process", AWWA Membrane Technology Conference, Atlanta, Georgia, 2003.

\* cited by examiner

Primary Examiner—Joseph Drodge
(74) Attorney, Agent, or Firm—Michael B. Martin; Thomas M. Breininger

(57) ABSTRACT

A method of conditioning an activated sludge in a membrane biological reactor comprising (i) adding to the activated sludge an effective amount of at least one water soluble cationic polymer to form a mixture of water and coagulated and flocculated suspended solids; and (ii) separating the coagulated and flocculated suspended solids from the water by filtering through an ultrafiltration or microfiltration membrane.

7 Claims, No Drawings

METHOD OF USING WATER SOLUBLE CATIONIC POLYMERS IN MEMBRANE BIOLOGICAL REACTORS

TECHNICAL FIELD

This invention concerns the use of water soluble cationic polymers to condition biomass in membrane biological reactors and increase water flux through the membrane.

BACKGROUND OF THE INVENTION

Biological treatment of wastewater for removal of dissolved organics is well known and is widely practiced in both municipal and industrial plants. This aerobic biological process is generally known as the "activated sludge" process in which micro-organisms consume the organic compounds through their growth. The process necessarily includes sedimentation of the micro-organisms or "biomass" to separate it from the water and complete the process of reducing Biological Oxygen Demand (BOD) and TSS (Total Suspended Solids) in the final effluent. The sedimentation step is typically done in a clarifier unit. Thus, the biological process is constrained by the need to produce biomass that has good settling properties. These conditions are especially difficult to maintain during intermittent periods of high organic loading and the appearance of contaminants that are toxic to the biomass.

Membranes coupled with biological reactors for the treatment of wastewater are well known, but are not widely practiced. In these systems, ultrafiltration (UF) or microfiltration (MF) membranes replace sedimentation of biomass for solids-liquid separation. The membrane can be installed in the bioreactor tank or in an adjacent tank where the biomass is continuously pumped from the bioreactor tank and back producing effluent with much lower total suspended solids (TSS), typically less than 5 mg/L, compared to 20 to 50 mg/L from a clarifier. More importantly, MBRs (membrane biological reactors) de-couple the biological process from the need to settle the biomass, since the membrane sieves the biomass from the water. This allows operation of the biological process at conditions that would be untenable in a conventional system including: 1) high MLSS (bacteria loading) of 10–30 g/L, 2) long sludge retention time, and 3) short hydraulic retention time. In a conventional system, such conditions could lead to sludge bulking and poor settleability.

The benefits of the MBR operation are low sludge production, complete solids removal from the effluent, effluent disinfection, combined COD, solids and nutrient removal in a single unit, high loading rate capability, no problems with sludge bulking, and small footprint. The disadvantages are aeration limitations, membrane fouling, and membrane costs.

Membrane costs are directly related to the membrane area needed for a given volumetric flow through the membrane, or "flux." Flux is expressed as liters/hour/m$^2$ (LMH) or gallons/day/ft$^2$ (GFD). Typical flux rates vary from approximately 20 LMH to about 100 LMH. These relatively low flux rates, due largely to fouling of the membranes, has slowed the growth of MBR systems for wastewater treatment.

Membrane fouling can be attributed to two key components in the feed: proteins and colloidal/particulate material. The MBR membrane interfaces with so-called "mixed liquor:" water with aggregates of bacteria or "flocs", free bacteria, protozoan, and various dissolved metabolites and cell components. In operation, the colloidal solids and dissolved organics deposit on the surface of the membrane. Colloidal particles form layers on the surface of the membrane, called a "cake layer." Cake layer formation is especially problematic in MBRs operated in the "dead end" mode where there is no cross flow; i.e., flow tangential to the membrane. Depending on the porosity of the cake layer, hydraulic resistance increases and flux declines In addition to cake formation on the membrane, small particles can plug the membrane pores, a fouling condition that may not be reversible. Compared to a conventional activated sludge process, floc (particle) size is reportedly much smaller in typical MBR units. Since MBR membrane pore size varies from about 0.04 to about 0.4 micrometers, particles smaller than this can cause pore plugging. Pore plugging increases resistance and decreases flux.

Therefore, there is an ongoing need to develop improved methods of conditioning the biomass in MBR units, particularly methods that reduce fouling of the membranes. This reduction in fouling, and the associated increase in membrane flux, permits the use of smaller systems, with a concomitant reduction in capital costs, or alternatively, increases treated wastewater volumetric flow from an existing system, with a corresponding reduction in cost of operation.

SUMMARY OF THE INVENTION

Polymeric water soluble coagulants and flocculants have not been used in MBR units, as it is generally understood that excess polymer fouls membrane surfaces, resulting in dramatic decreases in membrane flux. However, we have discovered that using water soluble cationic polymers in the MBR process can increase membrane flux by as much as 200 to 500 percent, while leaving virtually no excess polymer in the treated wastewater at the effective dose.

Accordingly, in its principal aspect, this invention is directed to a method of conditioning the biomass in a membrane biological reactor comprising (i) adding to the biomass an effective amount of at least one water soluble cationic polymer to form a mixture of water and coagulated and flocculated suspended solids; and (ii) separating the coagulated and flocculated suspended solids from the water by filtering through an ultrafiltration or microfiltration membrane.

DETAILED DESCRIPTION OF THE INVENTION

Definitions of Terms

As used herein, the following abbreviations and terms have the following meanings: AcAm for acrylamide; DMAEA·BCQ for dimethylaminoethylacrylate benzyl chloride quaternary salt; DMAEA·MCQ for dimethylaminoethylacrylate methyl chloride quaternary salt; Epi-DMA for epichlorohydrin-dimethylamine; DADMAC for diallyldimethylammonium chloride; pDADMAC for poly (diallyldimethylammonium chloride); and PEI for polyethyleneimine.

"Cationic polymer" means a polymer having an overall positive charge. The cationic polymers of this invention are prepared by polymerizing one or more cationic monomers, by copolymerizing one or more nonionic monomers and one or more cationic monomers, by condensing epichlorohydrin and a diamine or polyamine or condensing ethylenedichloride and ammonia or formaldehyde and an amine salt.

"Cationic Monomer" means a monomer which possesses a net positive charge. Representative cationic monomers include dialkylaminoalkyl acrylates and methacrylates and their quaternary or acid salts, including, but not limited to, dimethylaminoethyl acrylate methyl chloride quaternary salt, dimethylaminoethyl acrylate methyl sulfate quaternary salt, dimethyamninoethyl acrylate benzyl chloride quaternary salt, dimethylaminoethyl acrylate sulfuiric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylactylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl, methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride and diallyldimethyl ammonium chloride. Alkyl groups are generally $C_{1-4}$ alkyl.

"Nonionic monomer" means a monomer which is electrically neutral. Representative nonionic monomers include acrylamide, methacrylamide, N-methylacrylamide, N,N-dimethyl(meth)acrylamide, N,N-diethyl(meth)acrylamide, N-isopropyl(meth)acrylamide, N-t-butyl(meth)acrylamide, N-(2)-hydroxypropyl)methacrylamide, N-methylolacrylamide, N-vinylformamide, N-vinylacetamide, N-vinyl-N-methylacetamide, poly(ethylene glycol)(meth)acrylate, poly(ethylene glycol) monomethyl ether mono(meth)acryate, N-vinyl-2-pyrrolidone, glycerol mono((meth)acrylate), 2-hydroxyethyl (meth)acrylate, 2-hydroxypropyl(meth)acrylate, vinyl methylsulfone, vinyl acetate, glycidyl(meth)acrylate, and the like.

"Latex polymer" means an invertible water-in-oil polymer emulsion comprising a cationic polymer according to this invention in the aqueous phase, a hydrocarbon oil for the oil phase, a water-in-oil emulsifying agent and, potentially, an inverting surfactant. Inverse emulsion polymers are hydrocarbon continuous with the water-soluble polymers dispersed as micron sized particles within the hydrocarbon matrix. The latex polymers are then "inverted" or activated for use by releasing the polymer from the particles using shear, dilution, and, generally, another surfactant, which may or may not be a component of the inverse emulsion.

Latex polymers are prepared by dissolving the desired monomers in the aqueous phase, dissolving the emulsifying agent(s) in the oil phase, emulsifying the water phase in the oil phase to prepare a water-in-oil emulsion, in some cases, homogenizing the water-in-oil emulsion, polymerizing the monomers dissolved in the water phase of the water-in-oil emulsion to obtain the polymer as a water-in-oil emulsion. If so desired, a self-inverting surfactant can be added after the polymerization is complete in order to obtain the water-in-oil self-inverting emulsion.

"Dispersion polymer" means a water-soluble polymer dispersed in an aqueous continuous phase containing one or more inorganic/organic salts. Representative examples of low molecular weight cationic polymers prepared by dispersion polymerization of water-soluble polymers in an aqueous continuous phase are found in PCT/US01/09060.

"Solution polymer" means a water soluble polymer in a water continuous solution.

"Dry polymer" means a polymer prepared by gel polymerization. In a gel polymerization process, an aqueous solution of water-soluble monomers, generally 20–60 percent concentration by weight, along with any polymerization or process additives such as chain transfer agents, chelants, pH buffers, or surfactants, is placed in an insulated reaction vessel equipped with a nitrogen purging tube. A polymerization initiator is added, the solution is purged with nitrogen, and the temperature of the reaction is allowed to rise uncontrolled. When the polymerized mass is cooled, the resultant gel is removed from the reactor, shredded, dried, and ground to the desired particle size.

"Reduced Specific Viscosity" (RSV) is an indication of polymer chain length and average molecular weight. The RSV is measured at a given polymer concentration and temperature and calculated as follows:

$$RSV = \frac{\left[\left(\frac{\eta}{\eta_o}\right) - 1\right]}{c}$$

wherein $\eta$=viscosity of polymer solution;

$\eta_o$=viscosity of solvent at the same temperature; and c=concentration of polymer in solution. As used herein, the units of concentration "c" are (grams/100 ml or g/deciliter). Therefore, the units of RSV are dl/g. The RSV is measured at 30° C. The viscosities $\eta$ and $\eta_o$ are measured using a Cannon-Ubbelohde semimicro dilution viscometer, size 75. The viscometer is mounted in a perfectly vertical position in a constant temperature bath adjusted to 30±0.02° C. The error inherent in the calculation of RSV is about 2 dl/g. Similar RSVs measured for two linear polymers of identical or very similar composition is one indication that the polymers have similar molecular weights, provided that the polymer samples are treated identically and that the RSVs are measured under identical conditions.

IV stands for intrinsic viscosity, which is RSV in the limit of infinite polymer dilution (i.e. the polymer concentration is equal to zero). The IV, as used herein, is obtained from the y-intercept of the plot of RSV versus polymer concentration in the range of 0.015–0.045 wt % polymer.

Preferred Embodiments

The water soluble cationic polymers of this invention are added to the MBR unit to promote the incorporation of colloidal particles, such as cell fragments and single bacterium, into aggregate or floc structures and/or to increase the porosity of the cake layer. The water soluble cationic polymers may be solution polymers, latex polymers, dry polymers or dispersion polymers.

In a preferred aspect of this invention, the water soluble cationic polymer has a molecular weight of about 10,000 to about 2,000,000.

In another preferred aspect, the water soluble cationic polymer has a cationic charge of 100 mole percent In another preferred aspect, the water soluble cationic polymer is selected from the group consisting of a polymer of epichlorhydrin-dimethylamine crosslinked with either ammonia or ethylenediamine; a linear polymer of epichlorohydrin and dimethylamine, a homopolymer of polyethyleneimine; polydiallydimethylammonium chloride; homopolymer of DMAEM.H$_2$SO$_4$; polymerized triethanolamine/methyl chloride quat, polymerized triethanolamnine and tall oil fatty acid/methyl chloride quat, polyethylenedichloride/ammonia, and modified polyethyleneimine.

In another preferred aspect, the water soluble cationic polymer has a cationic charge of at least 70 mole percent.

In another preferred aspect, the water soluble cationic polymer is a polymer of (meth)acrylamide and one or more cationic monomers selected from diallyldimethylammonium chloride, dimethylaminoethyacrylate methyl chloride quaternary salt, dimethylaminoethylmethacrylate methyl chloride quaternary salt and dimethylaminoethylacrylate benzyl chloride quaternary salt.

In another preferred aspect, the water soluble cationic polymer is diallyldimethylammonium chloride/acryamide copolymer.

The MBR unit combines two basic processes: biological degradation and membrane separation-into a single process where suspended solids and microorganisms responsible for biodegradation are separated from the treated water by a membrane filtration unit. See Water Treatment Membrane Processes, McGraw-Hill, 1996, p 17.2. The entire biomass is confined within the system, providing for both control of the residence time for the microorganisms in the reactor (sludge age) and the disinfection of the effluent.

In general, influent enters the bioreactor, where it is brought into contact with the biomass. The mixture is pumped from the bioreactor and then, under pressure, filtered through a membrane. The permeate is discharged from the system while the entire biomass is returned to the bioreactor. Excess sludge is pumped out in order to maintain a constant sludge age, and the membrane is regularly cleaned by backwashing, chemical washing, or both.

Membranes used in the MBR unit include ultra- and microfiltration, inner and outer skin, hollow fiber, tubular, and flat, organic, metallic, ceramic, and the like. Preferred membranes for commercial application include hollow fiber with an outer skin ultrafilter, flat sheet (in stacks) ultrafilter and hollow fiber with an outer skin microfilter.

The wastewater may be pretreated before entering the MBR. For example, a bar screen, grit chamber or rotary drum screen may be used to achieve coarse solids removal. Suspended solids that are not removed during course solids removal may be removed using a sedimentation tank or a clarifier, called a "primary clarifier." In some cases coagulants such as ferric chloride or Epi-DMA and an anionic flocculant, such as a co-polymer of acrylic acid and acrylamide, are used in the primary clarifier to remove additional solids. In industrial plants where synthetic oils are present in the untreated wastewater, such as an oil refinery, pretreatment to remove oil is accomplished in units such as the inclined plate separator and the induced air flotation unit (IAF). Often, a cationic flocculant, such as a co-polymer of DMAEM and AcAm, is used in the IAF unit to increase oil removal. Also, excess phosphate is sometimes precipitated in the bioreactor by the addition of metal salts such as ferric chloride, so that the phosphate does not pass through the membrane and into the final effluent.

Depending on the ultimate use of the water and the purity of the MBR permeate, the clarified wastewater may also be subjected to post treatment. For instance, in water reclamation where treated wastewater is ultimately recharged into an aquifer used as a source for drinking water, the permeate may be further treated with reverse osmosis (RO) to reduce the dissolved mineral content If the water is to be recycled into a process, then the requirements of that process may necessitate further treatment of the permeate for removal of recalcitrant organics not removed by the MBR. Processes such as nanofiltration or carbon adsorption might be used in these cases. Finally, all biologically treated wastewater must be disinfected prior to discharge into a receiving stream, generally by addition of sodium hypochlorite, although this is not required for discharge into a municipal sewer.

The cationic polymers are introduced into the aeration basin/bioreactor by various means, for example by dosing into the wastewater feed line ahead of the bioreactor or by dosing directly into the bioreactor.

In all cases, the polymer should be thoroughly mixed with the mixed liquor in the bioreactor to maximize adsorption. This may be accomplished by feeding the polymer into an area of the bioreactor where an aeration nozzle is located. So-called "dead" zones in the bioreactor having little to no flow should be avoided. In some cases, a submerged propeller mixer may be needed to increase mixing in the basin, or the sludge can be re-circulated through a side arm loop.

Solution polymers can be dosed using a chemical metering pump such as the LMI Model 121 from Milton Roy (Acton, Mass.).

The recommended cationic polymer product dosage, based on mixed liquor in the bioreactor, is about 25 to about 1000 ppm, at MLSS (mixed liquor suspended solids) of approximately 1–2%. If the MLSS is lower than 1%, a proportionately lower dosage of polymer may be used. The polymer can be periodically pumped directly to the biorcactor mixed liquor or into the wastewater feed line. If polymer is fed continuously to the wastewater feed, then dosage would be considerably lower, about 0.25 to about 10 ppm. Polymer may be pumped intermittently ("slug fed") or continuously to the wastewater.

Overdosing polymer may result in reduced biological activity and organics removal in the bioreactor. For this reason, a low polymer dosage should be used initially: for example about 25 to about 100 ppm in mixed liquor. Additional polymer can then be fed to increase flux while maintaining biological activity. Permeate TOC (total organic carbon), COD (chemical oxygen demand), or BOD (biological oxygen demand) can be monitored to ascertain biological activity.

Alternately, ajar test can be conducted with samples of mixed liquor. Using a four paddle mixer, the sample jars are dosed with sequentially higher amounts of polymer; one jar is left untreated. After mixing, the samples are allowed to sit forseveral hours, so that the solids can settle to the bottom of the jar. The turbidity of the water on top of the settled solids (supernatant) is measured to ascertain the effectiveness of the polymer dosage. A turbidimeter from Hach Company (Loveland, Colo.) could be used. A dosage that gives lower turbidity in the jar than the untreated sample will increase flux in the MBR.

In the event of a polymer overdose, dosing of cationic polymer should be halted until biological activity returns to normal levels. It may also be necessary to discharge more biosolids from the bioreactor to assist in recovery of bioactivity. Addition of bioaugmentation products containing appropriate bacteria may also be helpful in recovering activity after polymer overdose.

The foregoing may be better understood by reference to the following Examples, which are presented for purposes of illustration and are not intended to limit the scope of this invention.

Representative cationic polymers of this invention are listed in Table 1. Polymers B and C are from Ciba (Tarrytown, N.Y.); Polymers M and N are from BASF (Mount Olive, N.J.). All other polymers are from ONDEO Nalco Company, Naperville, Ill.

TABLE 1

Representative cationic polymers

| Polymer | Chemistry | Mol. Wt. | I.V. (RSV) | % Actives |
|---|---|---|---|---|
| A | Epi-DMA, ammonia crosslinked | | 0.18 | 50 |
| B | Epi-DMA, EDA crosslinked | | 0.3 | 50 |
| C | Epi-DMA, EDA crosslinked | | | 45 |
| D | Epi-DMA, linear | | 0.1 | 50 |
| E | pDADMAC | | 0.2 | 30 |
| F | pDADMAC | | 1.0 | 18 |
| G | Ethylene dichloride/ammonia polymer | | (0.18) | 30 |
| H | Dimethylaminoethylmethacrylate sulfuric acid salt | 100,000 | | 30–40 |
| I | Triethanolamine methy chloride quaternary salt | 50,000 | | 100 |
| J | Bis-hexamethylenetriamine, crosslinked by EO on diethyene glycol capped with di-epichlorohydrin, further cross-linked by EP-HCl salt | <500,000 | | 50 |
| K | Copolymer of N,N-diallylcyclo-hexylamine/N-allylcyclohexylamine mixture and acrylamide | <500,000 | | 80 |
| L | Copolymer of triethanolamine and tall oil fatty acid, methyl chloride quaternary salt | <100,000 | | 50 |
| M | Polyethyleneimine | | 0.32 | 20 |
| N | Polyethyleneimine, crosslinked with EO | | 0.35 | 20 |
| O | DADMAC/acrylamide co-polymer | | 1.2 | 20 |
| P | Dimethylaminoethylacrylate methyl chloride quat | | (4.7) | 50 |

EXAMPLE 1

Samples of aerobically digested sludge from a midwestern municipal wastewater treatment plant (TSS about 1%) is mixed with representative water soluble cationic polymers of this invention using a paddle stirrer at 110 rpm for 5 minutes. The mixture is then placed in an Amicon Model 8400 Stirred Cell(Millipore Corporation, Bedford, Mass.) and forced through a Duraporeo® polyvinylidenedifluoride membrane with a nominal pore size of 0.1micron (Milliporre Corporation, Bedford, Mass.), at a constant pressure of 26 psi. Flux is determined by weighing permeate at timed intervals on a Mettler Toledo Model PG5002S top loading balance. Weight is recorded in 2 or 6 second intervals by computer. Volume is calculated assuming density of 1.00 g/mL, and no temeraurecorrections for density is made. Flux is calculated as follows:

J=913.7 ΔW/Δt

Where J=flux (L/m²/hour)

ΔW=difference between 2 weight measurements (grams)

Δt=difference between 2 time measurements (seconds)

The results are shown in Table 2.

TABLE 2

Membrane Flux for Representative Cationic Polymers in Sludge @ 26 psi

| Polymer | Active Dosage, ppm | Flux, LMH at 80 g |
|---|---|---|
| None | 0 | 65 |
| A | 50 | 576 |
| A | 100 | 1296 |
| A | 150 | 2088 |
| D | 100 | 295 |
| E | 150 | 900 |
| E | 90 | 612 |
| E | 30 | 252 |
| F | 150 | 1836 |

Additional tests are performed on sludge from the same municipal plant. In these tests the sludge samples with and without polymer are mixed at 275RPM for 15 minutes before testing in the Amicon cell. Feed pressure to the cell is 15 psi. The results are shown in Table 3.

TABLE 3

Membrane Flux for Representative Cationic Polymers in Sludge @ 15 psi

| Polymer | Actives Dosage (ppm) | Flux LMH at 80 g (70 g) |
|---|---|---|
| None | 0 | 57.6 |
| A | 100 | 410.4 |
| I | 100 | 358.9 |
| H | 100 | 359.3 |
| L | 100 | 181.4 |
| K | 100 | 57.24 |
| G | 100 | 284.4 |
| N | 100 | 286.9 |
| M | 100 | 1728 |
| M | 80 | 860.4 |
| M | 40 | 482.4 |
| M | 20 | 162 |
| None | 0 | (49) |
| A | 100 | (522) |
| P | 100 | (183) |

The data in Tables 2 and 3 clearly show a significant increase in flux through the membrane using water soluble cationic polymers to treat the sludge. In particular, NH₃-crosslinked epi-DMA shows as much as a 700% increase in flux, and PEI shows about a 1500% increase. Other cationic polymers, including linear epi-DMA and pDADMAC) also show increased flux relative to no treatment of the sludge.

EXAMPLE 2

Excess soluble cationic polymer is measured by adding varying amounts of a representative cationic polymer (Epi-DMA) to activated sludge from a midwestern municipal wastewater treatment plant, stirring the mixture at 110 rpm, centrifuging the mixture at 20,000 rpm for 25 minutes and then measuring the residual polymer in the centrate by colloid titration with a 0.001M solution of the potassium salt of polyvinylsulfonate (PVSK). The results are summarized in Table 4.

TABLE 4

Residual Polymer in Centrate in ppm

| Polymer Actives In Sludge | Polymer Actives In Centrate |
|---|---|
| 0 | 0 |
| 22.5 | 0 |
| 45 | 0 |
| 90 | 0 |
| 135 | 0 |
| 1350 | 4.5 |
| 1800 | 79.7 |
| 2250 | 211 |
| 4500 | 1650 |

As shown in Table 4, no residual polymer is detected in the centrifuge water centrate at polymer dosages that result in substantial increases in membrane flux. Dosages 30 times more than optimum are required for excess residual polymer to begin to appear in the centrate. This is very important discovery because excess polymer is known to foul membrane surfaces-resulting in dramatic decreases in membrane flux.

EXAMPLE 3

Five gallon buckets of sludge are taken from a western United StatesMBR unit treating municipal wastewater, airfreighted overnight and tested the next day. The sample is refrigerated overnight and then warmed to room temperature for testing on subsequent days. Cationic polymer (2.0 g of a 1% polymer solution) and 198 g of sludge are added to a 400 ml beaker. The mixture is stirred on a motorized stirrer for 15 minutes at 275 rpm to redisperse the solids. The mixed sludge is transferred to the Amicon cell with a polyvinylidenedifluoride membrane with nominal pore size of 0.2 microns just before the filtration test is performed.

The mixture is forced through the membrane at a constant pressure of either 15 or 8 lbs/in² (psi). Flux was determined by weighing permeate at timed intervals on a Mettler Toledo Model PG5002S top loading balance. Weight is recorded in 2 second intervals by computer. Volume was calculated assuming density of 1.00 g/mL, and no temperature corrections for density were made. Flux was calculated as follows:

$J = 913.7 \, \Delta W/\Delta t$

Where J=flux (L/m²/hour)

ΔW=difference between 2 weight measurements (grams)

Δt=difference between 2 time measurements (seconds)

At the end of the sludge sample test, the membrane is discarded. All tests with polymer treatment include a test in which no polymer is dosed to establish the baseline conditions. This test compares polymer-treated sludge flux rates to untreated sludge flux rates. This is done for quantification of the effects of dosage, chemistry, pressure, etc., on flux. The results are shown in Table 5.

TABLE 5

Membrane Flux for Representative Cationic Polymers in MBR sludge at 15 and 8 psi

| Polymer | Pressure psi | Actives Dosage ppm | Flux at 80 g LMH* |
|---|---|---|---|
| none | 15 | 0 | 311.4 |
| A | 15 | 25 | 806.4 |
| A | 15 | 50 | 1155.6 |
| A | 15 | 100 | 1512 |
| M | 15 | 0 | 370.8 |
| M | 15 | 20 | 928.8 |
| M | 15 | 40 | 1915.2 |
| none | 8 | 0 | 138.2 |
| A | 8 | 25 | 367.2 |
| A | 8 | 50 | 500.4 |
| A | 8 | 100 | 694.8 |

*Clean water flux at 8 psi was 1440 LMH and at 15 psi was 2160 LMH.

The data in Table 5 clearly show a significant increase in flux through the membrane at both pressures of 8 and 15 psi using cationic polymers A and M. to condition the sludge before the test.

Although this invention has been described in detail for the purpose of illustration, it is to be understood that such detail is solely for that purpose and that numerous modifications, alterations and changes can be made therein by those skilled in the art without departing from the spirit and scope of the invention except as it may be limited by the claims. All changes which come within the meaning and range of equivalency of the claims are to be embraced within their scope.

What is claimed is:

1. A method of conditioning an activated sludge in a membrane biological reactor comprising
   (i) adding to the activated sludge an effective amount based on the amount of suspended solids in the bioreactor or measurement of the effectiveness of polymer dosage of at least one water soluble cationic polymer to form a mixture of water and coagulated and flocculated suspended solids; and
   (ii) separating the coagulated and flocculated suspended solids from the water by filtering through an ultrafiltration or microfiltration membrane and substantially retaining said separated solids in said reactor or returning a substantial portion of said separated solids to said mixture.

2. The method of claim 1 wherein the water soluble cationic polymer has a molecular weight of about 10,000 to about 2,000,000.

3. The method of claim 1 wherein the water soluble cationic polymer has a cationic charge of at least 70 mole percent.

4. The method of claim 3 wherein the water soluble cationic polymer is a polymer of (meth)acrylamide and one or more cationic monomers selected from diallyldimethylammonium chloride, dimethylaminoethylacrylate methyl chloride quaternary salt, dimethylaminoethylmethacrylate methyl chloride quaternary salt and dimethylaminoethylacrylate benzyl chloride quaternary salt.

5. The method of claim 3 wherein the water soluble cationic polymer is diallyldimethylammonium chloride/acryamide copolymer.

6. The method of claim 1 wherein the water soluble cationic polymer has a cationic charge of 100 mole percent.

7. The method of claim 6 wherein the water soluble cationic polymer is selected from the group cosisting of polydiallyldimethylammonium chloride, polyethyleneimine, polyepiamine, polyepiamine crosslinked with ammonia or ethylenediamine, condensation polymer of ethlenedichloride and ammonia, condensation polymer of triethanolamine and tall oil fatty acid, poly(dimethylamineoethylmetharylate sulfuric acid salt), poly(dimethylarninoethylacrylate methyl chloride quaternary salt).

* * * * *